(12) United States Patent
Edpalm et al.

(10) Patent No.: US 11,683,510 B2
(45) Date of Patent: Jun. 20, 2023

(54) METHOD AND DEVICES FOR ENCODING AND STREAMING A VIDEO SEQUENCE OVER A PLURALITY OF NETWORK CONNECTIONS

(71) Applicant: Axis AB, Lund (SE)

(72) Inventors: Viktor Edpalm, Lund (SE); Alexandre Martins, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/868,579

(22) Filed: May 7, 2020

(65) Prior Publication Data
US 2020/0374536 A1    Nov. 26, 2020

(30) Foreign Application Priority Data
May 22, 2019 (EP) .................................. 19175980

(51) Int. Cl.
*H04N 19/115*   (2014.01)
*H04N 19/146*   (2014.01)
*H04N 19/184*   (2014.01)
*H04N 19/436*   (2014.01)
*H04N 19/196*   (2014.01)
*H04L 65/611*   (2022.01)

(52) U.S. Cl.
CPC ......... *H04N 19/436* (2014.11); *H04N 19/115* (2014.11); *H04N 19/146* (2014.11); *H04N 19/184* (2014.11); *H04N 19/196* (2014.11); *H04L 65/611* (2022.05)

(58) Field of Classification Search
None
See application file for complete search history.

(56) References Cited

U.S. PATENT DOCUMENTS

| | | | |
|---|---|---|---|
| 6,151,632 A | 11/2000 | Chaddha et al. | |
| 6,728,263 B2 | 4/2004 | Joy et al. | |
| 8,456,532 B1 | 6/2013 | Petkevich et al. | |
| 9,954,926 B2 | 4/2018 | Yoon | |

(Continued)

FOREIGN PATENT DOCUMENTS

GB    2552376 A    1/2018

OTHER PUBLICATIONS

Office Action dated Mar. 18, 2020, in corresponding European patent Application No. 19175980.2, 5 pages.

(Continued)

*Primary Examiner* — Samuel D Fereja
(74) *Attorney, Agent, or Firm* — Xsensus LLP (57) ABSTRACT

There is provided a method and devices for encoding and streaming a video sequence over a plurality of network connections. A video sequence is encoded (S04) in parallel into a number of encoded video sequences having different video properties. The encoded video sequences are then streamed (S06) in parallel over the plurality of network connections. Each encoded video sequence is streamed over at least one of the plurality of network connections, and, for each network connection, an encoded video sequence having video properties that match desired video properties of the network connection. In response to detecting (S08) that the desired video properties of one of the network connections have changed, the number of encoded video sequences is increased or decreased (S10).

10 Claims, 3 Drawing Sheets

(56) References Cited

U.S. PATENT DOCUMENTS

| | | |
|---|---|---|
| 10,148,990 B2 | 12/2018 | Pichon et al. |
| 10,341,670 B1* | 7/2019 | Brailovskiy ......... H04N 19/146 |
| 2005/0123058 A1* | 6/2005 | Greenbaum ......... H04N 19/186 |
| | | 375/240.28 |
| 2011/0032986 A1 | 2/2011 | Banger et al. |
| 2011/0188567 A1 | 8/2011 | Blum |
| 2011/0310957 A1 | 12/2011 | Le Floch et al. |
| 2012/0213272 A1 | 8/2012 | Liu et al. |
| 2015/0201197 A1* | 7/2015 | Marlatt ............ H04N 21/85406 |
| | | 375/240.03 |
| 2017/0017127 A1 | 1/2017 | Gan |
| 2017/0078574 A1* | 3/2017 | Puntambekar ..... H04N 5/23254 |
| 2017/0171271 A1 | 6/2017 | Kelly et al. |
| 2017/0180740 A1 | 6/2017 | Topiwala et al. |
| 2018/0184146 A1* | 6/2018 | Pichon ............... H04N 21/6125 |
| 2018/0192061 A1* | 7/2018 | He ...................... H04N 19/164 |

OTHER PUBLICATIONS

Notice of Allowance dated Dec. 7, 2020, in corresponding European patent Application No. 19175980.2, 33 pages.

\* cited by examiner

METHOD AND DEVICES FOR ENCODING AND STREAMING A VIDEO SEQUENCE OVER A PLURALITY OF NETWORK CONNECTIONS

CROSS-REFERENCE TO RELATED APPLICATION

The present application claims priority to EP 19175980.2, filed May 22, 2019, the entire contents of which are incorporated herein by reference.

TECHNICAL FIELD

The present invention relates to the field of video streaming. In particular, it relates to a method and devices for encoding and streaming a video sequence over a plurality of network connections.

BACKGROUND

Within the field of video surveillance, it is common to have cameras that capture a video, process and encode the video, and stream the video to a recipient in real-time. The video may not only be streamed to one recipient, but several recipients may request having the same video streamed at the same time. For example, the video may simultaneously be streamed to a network attached storage, to a command center for monitoring, and to a mobile client for an on-the-site guard. This is sometimes referred to as video multicasting, meaning that a video stream is broadcasted to multiple recipients.

In such situations it is common to encode the video once and send the same encoded video to all recipients. However, as the connections of the different recipients may differ in terms of bandwidth, and the recipients may have different demands in terms of image quality, a single encoded video may not be enough to satisfy all the recipients at the same time. For example, if the bitrate of the encoded video is adapted to the recipient being associated with the lowest bandwidth, the recipients having a higher bandwidth connection may not be satisfied with their image quality due to the low bitrate of the video.

One way to approach this problem is to run a predefined multitude of encodings of the video in parallel. In that way, several versions of encoded video, having different properties in terms of bitrate and video quality, will be available to choose from. The most appropriate version of encoded video may then be selected for each recipient depending on the bandwidth and the desired video quality of the recipient. However, producing several versions of encoded video is computationally expensive. Further, some versions of encoded video may be produced without ever being sent to a recipient. Thereby, some of the computational effort is made for no reason. There is therefore a need for improvements.

SUMMARY OF THE INVENTION

In view of the above, it is thus an object of the present invention to mitigate the above problems and provide a solution for simultaneous streaming of a video to multiple recipients such that each recipient's needs are met at a lower computational cost.

According to a first aspect of the invention, the above object is achieved by a method of encoding and streaming a video sequence over a plurality of network connections, comprising:

receiving a video sequence captured by a camera, encoding, in parallel, the video sequence into a number of encoded video sequences using different encoding parameters such that the encoded video sequences have different video properties, streaming the encoded video sequences in parallel over the plurality of network connections, wherein each encoded video sequence is streamed over at least one of the plurality of network connections, and, for each network connection, an encoded video sequence having video properties that match desired video properties of the network connection is streamed, detecting that the desired video properties of one of the network connections have changed, and in response to the detecting, increasing or decreasing the number of encoded video sequences which are encoded in parallel and streamed over the plurality of network connections.

With this arrangement, each encoded video sequence is streamed over at least one of the connections depending on the desired video properties of the connections. Thus, on the one hand, computational effort is saved since no encoded video sequence is produced without being sent to a recipient. On the other hand, the possibly different needs of the network connections are met since, for each network connection, an encoded video sequence that matches the desired video properties of the network connection is streamed.

The needs of the network connections may vary over time. For instance, the quality of a network connection may go up or down, or the recipient using the network connection may change its preferences. To assure that the needs of the network connections are met, the method adapts over time the number of parallel encoded video sequences that are generated and streamed as the desired video properties change. Specifically, as the desired video properties of one of the network connections change, the number of encoded video sequences may be adjusted in view of the change. The adjustment may include increasing or decreasing the number of encoded video sequences. For example, another encoded video sequence may have to be generated to match the new needs of that network connection, or the encoding of one of the available encoded video sequences may be terminated since another one of the available encoded video sequences fulfils the new needs of that network connection. Thus, by using the proposed method, only the number of encoded video sequences that are necessary to satisfy the needs of the network connections are generated and streamed in parallel at each point in time.

When encoding a video sequence, an encoder uses encoding parameters which describe how the encoder should compress and encode the video sequence. Non-limiting examples of encoding parameters are quantization parameter, image resolution, frame rate, group of pictures (GOP) length, GOP structure (I-frame vs intra-refresh), contrast, sharpness, and level of spatial variation of the quantization parameter within a frame. By GOP length is meant the distance between two consecutive intra-coded frames. By GOP structure is meant whether intra-coded frames or intra-refresh is used.

As a result of using certain encoding parameters, the encoded video will have certain properties referred to herein as video properties. Specifically, the properties associated with an encoded video sequence may be related to at least one of video quality of the encoded video sequence, bitrate of the encoded video sequence, stability of the encoded video sequence with respect to packet loss, and stability of the encoded video with respect to packet delay.

The stability of the encoded video with respect to packet loss reflects the impact of packet loss during streaming on the resulting video, e.g., in terms of how long it takes for the video to recover after a packet loss. An encoded video which allows a faster recovery after packet loss is more stable than an encoded video for which the recovery takes longer. For example, due to packet loss the video may not be recovered until the next intra-coded frame has been received. By reducing the GOP length and/or increasing the frame rate, an encoded video which is more stable against packet loss is obtained.

The stability of the encoded video with respect to packet delay reflects the variability of the packet delivery time over the network, such as whether the packets are delivered with a 30-36 ms delay, or with a 10-100 ms delay. Highly variable delays may cause problems for network elements. The packet delay time is related to the temporal variability of the bitrate of the encoded video. A higher variability of the bitrate typically results in a higher variability of the packet delivery time and vice versa. By reducing the temporal variability of the bitrate of the encoded video, for instance by using intra-refresh rather than full intra-frames to avoid spikes in the bitrate, the encoded video becomes more stable with respect to packet delay. Another way of reducing packet delay variability for a certain encoded video sequence is to give that encoded video sequence a higher internal priority, such as a real-time priority. In that way, the packets of that encoded video sequence are given higher priority when it comes to transmission compared to packets of other encoded video sequences, and the transmission delays may hence be reduced.

As described above, the different network connections may have different preferences or desires when it comes to the video properties of the video being streamed over the connections. In other words, each network connection may have desired video properties. The desired video properties may for instance concern a desired bitrate, a desired video quality, or a desired stability of the encoded video with respect to packet loss. The desired video properties of a network connection may hence be said to reflect conditions and preferences of a network connection. For example, the desired bitrate may reflect the bandwidth condition of the network connection, wherein a lower bandwidth corresponds to a lower bitrate and vice versa.

The detection of a change of the desired video properties of one of the network connections may result in an increase of the number of encoded video sequences. This typically happens if the newly desired video properties of the network connection do not match the video properties of any of the currently available encoded video sequences. If so, another encoded video sequence is generated and streamed to the concerned video connection. In more detail, the number of encoded video sequences may be increased by encoding the video sequence into a further encoded video sequence in parallel with said number of encoded video sequences, wherein the further encoded video sequence is streamed over said one of the network connections, while the remaining encoded video sequences are continued to be streamed over the other of the plurality of network connections.

The further video sequence may be encoded to have video properties corresponding to the desired video properties of said one of the network connections. In that way, the method keeps satisfying the needs of each network connection.

Following the detection of a change of the desired video properties of one of the connections, it may also happen that the number of encoded video sequences is reduced. This may typically happen if the previously desired video properties of the connection are no longer desired by any of the connections, and the newly desired video properties of the connection match video properties of an available encoded video sequence. If so, the number of encoded video sequences may be decreased by terminating the encoding and streaming of the encoded video sequence which is streamed to said one of the network connections, while maintaining the encoding and streaming of any remaining encoded video sequence. Further, a remaining encoded video sequence may be streamed to said one of the network connections, the remaining encoded video sequence having video properties matching the desired video properties, as changed, of said one of the network connections. As a result, the number of encoded video sequences is hence reduced while the needs of each of the network connections are satisfied.

The method may further comprise measuring or receiving feedback regarding desired video properties of the plurality of network connections. The measurements or the feedback may then be analysed to see how many different encoded video sequences need to be encoded. In more detail, the method may comprise identifying a number of distinct desired video properties among the desired video properties of the plurality of network connections, and setting the number of encoded video sequences to correspond to the number of distinct desired video properties. In this respect, the desired video properties of one network connection and the desired video properties of another network connection may be considered as distinct if they differ by more than a predefined threshold. In this way, the method may keep track of how many encoded video sequences need to be encoded at any point in time to satisfy the needs of the network connections while keeping the computational effort as low as possible.

Specifically, when the measurements or the feedback indicate that the desired video properties of one of the network connections have changed, the method may comprise analysing the number of distinct desired video properties of the connections to find out whether to increase, decrease, or keep the number of encoded video sequences unaltered. In more detail, the number of encoded video sequences may be increased or decreased such that the number of encoded video sequences keeps corresponding to the number of distinct desired video properties of the network connections also after the desired video properties of said one of the network connections have changed.

The method may further comprise setting encoding parameters used when producing the number of encoded video sequences such that the different video properties of the number of encoded video sequences match the desired video properties of the plurality of network connections. In this way, one can control the encoding such that the needs of the network connections are satisfied. The encoding parameters may be set by a controller whose task is to control the video properties of the encoded video sequences being output of the encoder. For example, a bitrate controller may be used to set encoding parameters such that the bitrates of the encoded video sequences correspond to the desired bitrates of the network connections. In other words, the target bitrates provided as input to the bitrate controller may be set to correspond to the desired bitrates of the plurality of network connections. Thus, the target bitrate which is input to the controller may also be considered an encoding parameter that, in the end, governs how the encoder should compress and encode the video sequence.

The bandwidth of the network connections may vary over time. For example, as the bandwidth goes down, the network connection may start to lose data packets. Further, the amount of data packets in the streaming buffer may increase, which in the end will cause data packets to be dropped. Such problems indicate that the bitrate of the encoded video is higher than the network connection currently can handle. In other words, the network connection thus desires a lower bitrate. In contrast, as the bandwidth goes up, there may be room for streaming of additional data packets on the network connection. In that case, the network connection may handle a higher bitrate. Accordingly, detecting that the desired video properties of one of the network connections have changed may include measuring or receiving feedback of a change in bandwidth of said one of the network connections. The measurement or the feedback may reflect changes in the streaming buffer size or changes in the number of packets being lost.

The receivers associated with the plurality of network connections may have different preferences when it comes to video quality. Those preferences may vary over time. For instance, consider the situation where video is streamed from a surveillance camera to a monitoring center where an operator watches the video in real time. Suddenly, there may be an interesting event in the video, such as a suspected crime, and the operator may suddenly want to watch and record the video with higher quality. The operator may then send a request to the camera for higher video quality, for instance by pressing a panic button. In response, the camera may encode and stream a video with higher quality to the requesting recipient. Thus, the detecting that the desired video properties of one of the network connections have changed may include receiving a request for higher video quality from said one of the network connections.

As indicated in the above example, the method may be performed in a camera in real time. In that case, the method may comprise capturing the video sequence using a sensor of the camera, forwarding the captured video sequence to an image processing pipeline of the camera to perform image processing on the video sequence, and forwarding the captured and image processed video sequence from the image processing pipeline to an encoder of the camera to perform said encoding of the video sequence. Thus, the video sequence which is input to the encoder is directly forwarded from the image sensor via the image processing stages without delay. In other words, the encoding of the video sequence is not a matter of transcoding of already encoded data.

According to a second aspect of the invention, the above object is achieved by a device for encoding and streaming a video sequence over a plurality of network connections, comprising:

an encoder configured to receive a video sequence captured by a camera and encode, in parallel, the video sequence into a number of encoded video sequences using different encoding parameters such that the encoded video sequences have different video properties, a network interface configured to stream the encoded video sequences in parallel over the plurality of network connections, wherein each encoded video sequence is streamed over at least one of the plurality of network connections, and, for each network connection, an encoded video sequence having video properties that match desired video properties of the network connection is streamed, and a controller configured to detect that the desired video properties of one of the network connections have changed, and in response to the detecting, instruct the encoder to increase or decrease the number of encoded video sequences which are encoded in parallel and streamed over the plurality of network connections.

According to a third aspect of the invention, the above object is achieved by a video camera comprising:

an image sensor for capturing a video sequence, and a device according to the second aspect for encoding and streaming the video sequence over a plurality of network connections.

According to a fourth aspect of the invention, the above object is achieved by a computer program product comprising a non-transitory computer readable medium storing computer code instructions adapted to carry out the method of the first aspect when executed by a device having processing capability.

The second, third, and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown.

Figure 1:
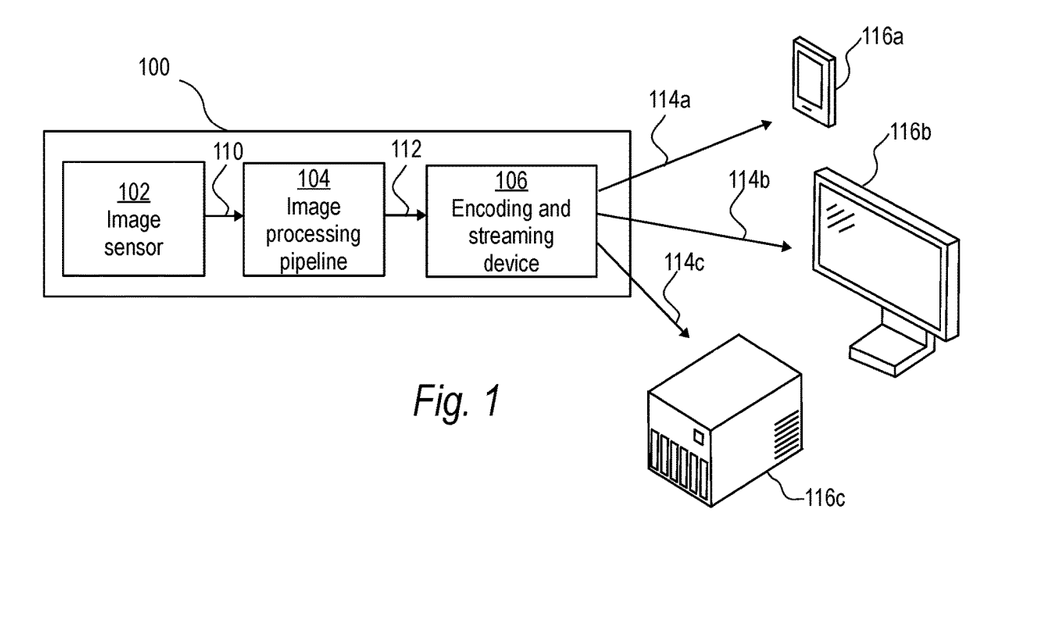
FIG. 1 schematically illustrates a system for encoding and streaming a video sequence over a plurality of network connections according to embodiments.

FIG. 1 illustrates a video camera 100. The video camera 100 may be a monitoring camera which is used to monitor premises for surveillance purposes. The camera 100 includes an image sensor 102, an image processing pipeline 104, and an encoding and streaming device 106. The image sensor 102 captures a sequence of images, i.e., a video sequence 110. The image sensor 102 forwards the video sequence 110 to the image processing pipeline 104. The image processing pipeline 104 performs various kinds of image processing on the images in the video sequence 110 as known in the art, such as noise reduction, image scaling, and image enhancement. The processed video sequence 112 is then forwarded to the encoding and streaming device 106. The encoding and streaming device 106 encodes the processed video sequence 112 and streams encoded video in parallel over a plurality of network connections, here illustrated by a first, a second, and a third network connection 114a, 114b, 114c. The plurality of network connections 114a, 114b, 114c are each associated with a receiving device, here illustrated by a first, a second, and a third receiving device 116a, 116b, 116c. By way of example, receiving device 116a may be a mobile client of a guard at the monitored premises, the receiving device 116b may be a video management system at a surveillance center, and the receiving device 116c may be a network attached storage.

The different network connections 114a, 114b, 114c may have different requirements when it comes the properties of the encoded video. For example, some of the receiving devices 116a, 116b, 116c may desire a higher video quality than others. In the example of FIG. 1, the video management system 116b and the video recorder 116c, may desire a higher video quality than the mobile client 116a. Further, some of the network connections 114a, 114b, 114c may have a higher bandwidth than others, thereby supporting a higher bitrate of the encoded video. For instance, the network connections 114b and 114c may support a higher bitrate than the network connection 114a associated with the mobile client 116a. Still further, some of the receiving devices 116a, 116b, 116c may require a higher stability of the encoded video to reduce the impact of packet loss on the encoded video. Accordingly, the different network connections 114a, 114b, 114c may desire different video properties of the encoded video based on the network conditions and preferences of the end user. In order to meet the different desires of the network connections 114a, 114b, 114c, the encoding and streaming device 106 may simultaneously prepare more than one version of encoded video for streaming over the network connections 114a, 114b, 114c. For example, the different versions of encoded video may have different bitrates, different image quality, and/or different stability with respect to packet loss. Further, as the desired video properties of the network connections 114a, 114b, 114c may vary over time, the encoding and streaming device 106 may adaptively vary the number of versions of encoded video being encoded in parallel as will be explained in more detail below.

Figure 2:
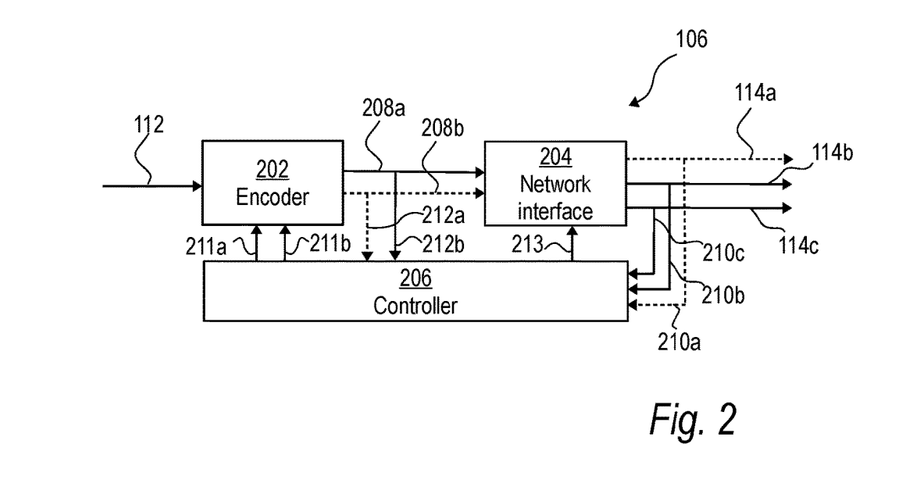
FIG. 2 schematically illustrates a device for encoding and streaming a video sequence over a plurality of network connections according to embodiments.

FIG. 2 illustrates the encoding and streaming device 106 in more detail. It comprises an encoder 202, a network interface 204, and a controller 206. Generally, the device 104 may comprise circuitry which is configured to implement the encoder 202, the network interface 204, and the controller 206.

In a hardware implementation, each of the components 202, 204, 206, may correspond to circuitry which is dedicated and specifically designed to provide the functionality of the component. The circuitry may be in the form of one or more integrated circuits, such as one or more application specific integrated circuits or one or more field-programmable gate arrays. By way of example, the controller may thus comprise circuitry which, when in use, controls the number of encoded video streams to be produced by the encoder.

In a software implementation, the circuitry may instead be in the form of a processor, such as a microprocessor, which in association with computer code instructions stored on a (non-transitory) computer-readable medium, such as a non-volatile memory, causes the device 106 to carry out any method disclosed herein. Examples of non-volatile memory include read-only memory, flash memory, ferroelectric RAM, magnetic computer storage devices, optical discs, and the like. In a software case, the components 202, 204, 206 may thus each correspond to a portion of computer code instructions stored on the computer-readable medium, that, when executed by the processor, causes the device 106 to carry out the functionality of the component.

It is to be understood that it is also possible to have a combination of a hardware and a software implementation, meaning that the functionality of some of the components 202, 204, 206 are implemented in hardware and others in software.

Figure 4:
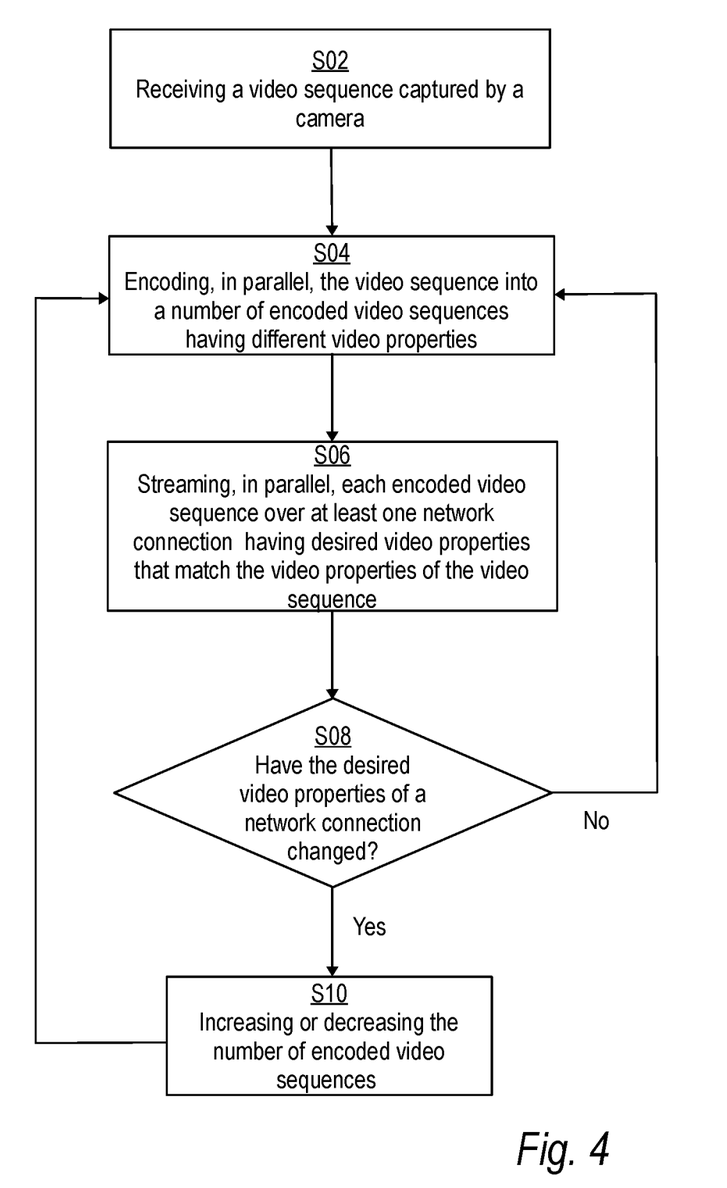
FIG. 4 is a flow chart of a method for encoding and streaming a video sequence over a plurality of network connections.

The operation of the encoding and streaming device 106 will now be explained with reference to the flowchart of FIG. 4. In step S02, the encoder 202 receives the video sequence 112 captured and processed by the camera 100 as input. In step S04, the encoder 202 then encodes the received video sequence 112 into a number of encoded video sequences 208a, 208b. For this purpose, the encoder 202 may implement any known encoding scheme, such as H.264 or H.265 encoding. It is understood that frames of the video sequence 112 typically are received sequentially and that the frames are encoded one after the other upon receipt. The number of encoded video sequences is set by the controller 206 and may vary over time between one up to the number of network connections 114a, 114b, 114c. Hence, while two encoded video sequences 208a, 208b are illustrated in the example of FIG. 2, it is understood that the number of encoded video sequences may vary between one and three in that example. It is also understood that in some cases, the capacity of the encoder 202 may set a limit for how many encoded video sequences it may produce in parallel.

The number of video sequences to encode may be determined by the controller 206 based on feedback 210a, 210b, 210c from the network connections 114a, 114b, 114c. The feedback 210a, 210b, 210c may relate to desired video properties of the network connections 114a, 114b, 114c, such as desired bitrate, desired video quality, and/or desired stability of the encoded video with respect to packet loss or packet delay. The feedback 210a, 210b, 210c may be in the form of measurements of the current bandwidths (i.e., currently desired bitrates) of the network connections 114a, 114b, 114c, explicit requests from the network connections 114a, 114b, 114c for a certain video quality or video stability.

Various measurements which are indicative of the bandwidth can be made. This includes measurements of packet loss and buffer sizes. For instance, the recipients 116a, 116b, 116c may via messaging supported by the network protocol provide feedback regarding which packets were delivered, which packets were not delivered, and when the packets were delivered. Such messaging finds support in the TCP/IP protocol among others. The number of packets that were not delivered are indicative of the bandwidth since, as the bandwidth goes down, more packets will be lost. There are also various buffers in the network, such as in the camera 100, in the recipients 116a, 116b, 116c, and in switches in the network, from which feedback may be received. For instance, there may be one or more buffers in the camera 100 which store packets that have not been sent over the one or more connections 114a, 114b, 114c. The sizes of those buffers are indicative of the bandwidth of the connections 114a, 114b, 114c since when the bandwidth goes down, packets tend to accumulate in the buffers. The measurements may also include measurements of other parameters than those mentioned above, such as TCP window size or the time between expected arrival of a packet and real arrival of the packet (sometimes referred to as jitter). How to carry out such measurements and receiving such requests are per se known in the art and can be performed in various ways.

Feedback related to video stability may be in the form of a request for a reduced packet loss rate, in the form of an upper limit for how many percent of an image frame that is acceptable to lose, and/or in the form of an upper limit for transmission delays of a packet.

From the feedback 210a, 210b, 210c, the controller 206 may determine how many encoded video sequences should be generated by the encoder 202. The determination may be made for each image frame or more seldom, such as once per GOP, or once per second. In more detail, the controller 206 may compare the desired video properties of the different network connections 114a, 114b, 114c to each other to see how many of these that differ. In other words, the controller 206 finds out how many distinct sets of video properties that are desired by the network connections 114a, 114b, 114c. The controller 206 may then set the number of encoded video sequences 208a, 208b to be equal to the number of distinct sets of desired video properties. For example, if all network connections 114a, 114b, 114c desire the same set of video properties, the number of distinct desired video properties is equal to one. If all network connections 114a, 114b, 114c desire different sets of video properties, the number of distinct desired video properties is equal to the number of network connections. If some of the network connections 114a, 114b, 114c desire the same set of video properties, while others desire different sets of video properties, the number of distinct video properties will be somewhere between one and the number of network connections 114a, 114b, 114c. In the example of FIG. 2, it is assumed that two of the network connections, such as connections 114b and 114c, desire the same video properties while the third network connection 114a desires different video properties. Therefore, in the FIG. 2 example, the number of distinct desired video properties is equal to two. When comparing the desired video properties to each other, the controller may apply a certain tolerance such that the set of desired video properties of one network connection are considered the same as the set of desired video properties of another network connection if they are within a predetermined margin from each other. The predetermined margin may be a configurable parameter of the controller 206.

The controller 206 may further determine encoding parameters 211a, 211b to be used by the encoder 202 when encoding the received video sequence 112 into the encoded video sequences 208a, 208b. The controller 206 may determine one set of encoding parameters for each encoded video sequence 208a, 208b. In the example of FIG. 2, there is a first set of encoding parameters 211a which is used by the encoder 202 when producing the first encoded video sequence 208a, and a second set of encoding parameters 211b which are used when producing the second encoded video sequence 208b. The encoding parameters may, for example, include the quantization parameter, resolution, frame rate, GOP length, and GOP structure. The controller 206 sets the encoding parameters 211a, 211b such that the resulting video properties of the encoded sequences 208a, 208b match the video properties which currently are desired by the network connections 114a, 114b, 114c. A video property (or a set of video properties) may be said to match a desired video property (or a set of desired video properties) if they are closer to each other than a predefined threshold (or a predefined set of thresholds). In the example of FIG. 2, the encoding parameters 211a may be set such that the video properties of the encoded video sequence 208b match the desired video properties of network connection 114a, while the encoding parameters 211b are set to match the video properties of the encoded video sequence 208a with the desired video properties of network connections 114b and 114c. For this purpose, any known control scheme, such as proportional control may be used. In more detail, the controller 206 may receive feedback 212a, 212b regarding current video properties 212a, 212b of the encoded video sequences 208a, 208b. The controller 206 may then set the encoding parameters 211a, 211b based on a comparison of the current video properties 212a, 212b of the encoded video sequences 208a, 208b to the distinct desired video properties of the network connections 114a, 114b, 114c. The desired video properties may hence be used as target values for the corresponding video properties of the encoded video sequences 208a, 208b. For example, the controller 206 may implement a bitrate controller where the distinct desired bitrate levels of the network connections 114a, 114b, 114c are provided as target values for the bitrate levels of the encoded video sequences 208a, 208b.

The encoder then forwards the video sequences 208a, 208b to the network interface 204 which, in step S06, streams the encoded sequences 208, 208b in parallel over the network connections 114a, 114b, 114c. For this purpose, the network interface 204 may include a streaming buffer which holds not yet transmitted data packets of the encoded sequences 208a, 208b. The controller 206 keeps track of which encoded video sequence 208a, 208b should be streamed over each network connection 114a, 114b, 114c. For example, the controller 206 may maintain a table which maps the encoded video sequences 208a, 208b to the network connections 114a, 114b, 114c. The controller 206 may relay that information 113 to the network interface 204. In that way, an encoded video sequence 208a, 208b having video properties that match the desired video properties of the network connection may be streamed to each network connection 114a, 114b, 114c. In the example of FIG. 2, the network interface 204 may hence stream the encoded video sequence 208b over network connection 114a, while it streams the encoded video sequence 208a over network connections 114b, 114c. Notably, each encoded video sequences 208a, 208b is hence streamed over at least one of the network connections 114a, 114b, 114c.

The desired video properties of the network connections 114a, 114b, 114c may change over time. The controller 206 may therefore, in step S08, monitor the feedback 210a, 210b, 210c to detect changes in the desired video properties of the network connections 114a, 114b, 114c. For example, the controller 206 may detect a change in bandwidth if there is a significant change in the packet loss rate or the streaming buffer sizes. Further, the controller 206 may detect that there is a change upon receiving a request from one or the network connections 114a, 114b, 114c. If a change in the desired video properties of one or more of the network connections 114a, 114b, 114c is detected, the controller 206 may check whether the number of encoded video sequences 208a, 208b needs to be adjusted to meet the needs of all network connections 114a, 114b, 114c. For instance, the controller 206 may check whether the detected change has led to a change in the number of distinct sets of desired video properties of the network connections. 114a, 114b, 114c. If so, the controller 206 adjusts the number of encoded video sequences. Following a detected change in the desired video properties, the controller 206 may hence in step S10 increase or decrease the number of encoded video sequences. If no change is detected in step S08, the current number of encoded video sequences may be maintained.

A sequence of examples will now be described to further illustrate the adjustment of the number of encoded video sequences.

Figure 3A:
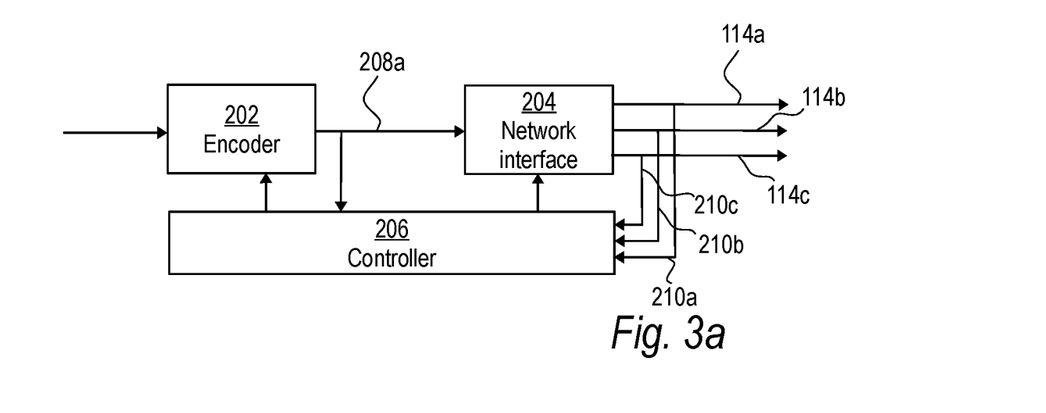
FIGS. 3a, 3b, 3c are a sequence of examples which illustrate the functionality of the device of FIG. 2.
Figure 3B:
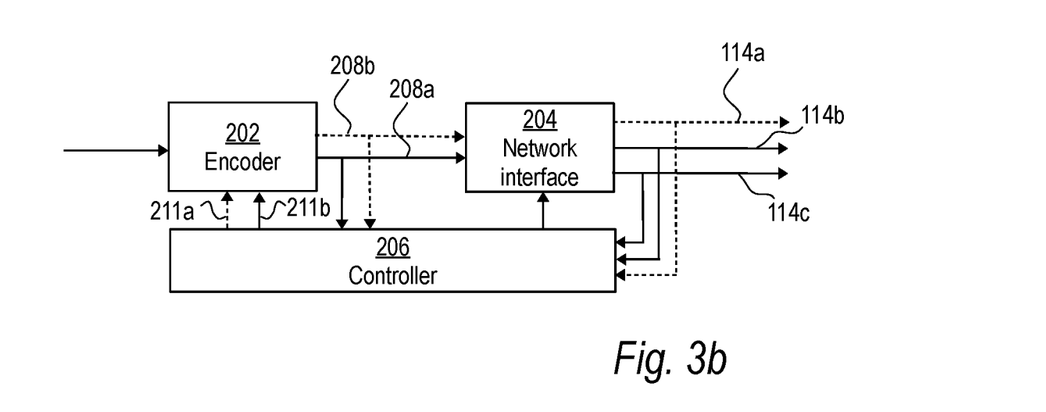

FIG. 3a illustrates a situation where the network connections 114a, 114b, 114c desire the same video properties, in this case the same bitrate, and hence a single encoded video sequence 208a is streamed in parallel over each network connection 114a, 114b, 114c. Based on the feedback 210a, 210b, 210c from the connections, the controller 206 may detect that there is a change in bandwidth of one of the network connections, such as network connection 114a. For example, the controller 206 may detect that the network connection 114a has started to drop packets, or that that number of dropped packets has increased beyond a certain level. Accordingly, a single encoded video sequence 208a is no longer enough to meet the needs of all network connections at the same time. Specifically, the network connection 114a, on the one hand, and the network connections 114b, 114c, on the other hand, require encoded video sequences with distinct bitrates. Therefore, and as illustrated in FIG. 3b, the controller 206 instructs the encoder 202 to initiate the production of an additional encoded video sequence 208b. The encoding parameters of the additional encoded video sequence 208b are set such that the bitrate of the encoded video sequence 208b matches the required bitrate of the network connection 114a. For example, the encoded video sequence 208b may be encoded with a higher value of the quantization parameter to achieve a reduced bitrate. Alternatively, or additionally, the GOP structure may be changed to use intra-refresh instead of intra-coded frames to avoid spikes in the bitrate that may result in packet loss. The encoded video sequence 208b is then streamed to the network connection 114a, while the other encoded video sequence 208a is still streamed over the other the network connections 114b, 114c.

Figure 3C:
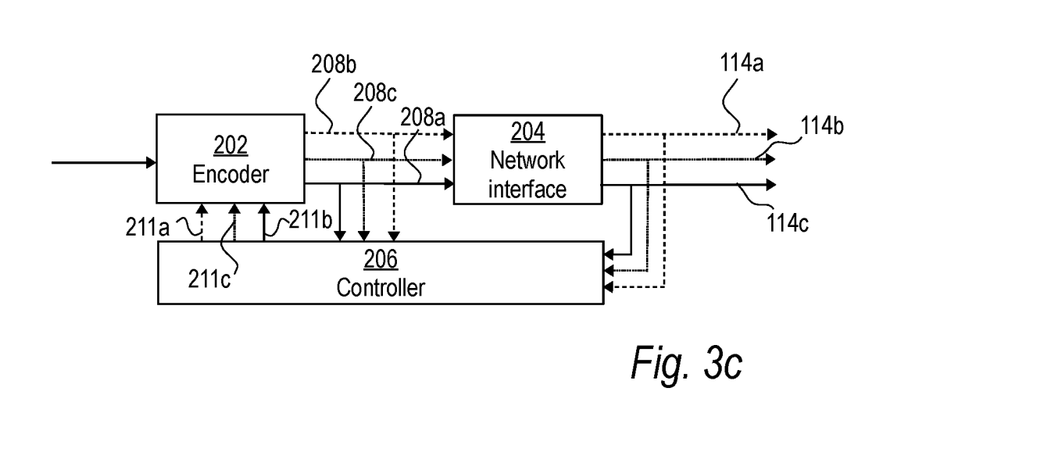

The feedback 210a, 210b, 210c from the network connections 114a, 114b, 114c may also be in the form of a request for a changed image quality. For example, following an interesting event in the video, a user associated with one of the network connections 114a, 114b, 114c, such as network connection 114b, may request a higher image quality. A situation where this could be used is when an operator at a monitoring center presses a panic button following a crime scene being depicted in the video. To deliver the higher image quality to network connection 114b, the controller 206 may instruct the encoder to initiate another encoded video sequence 208c as shown in FIG. 3c. The encoded video sequence 208c may be produced using encoding parameters 311c that result in the higher image quality requested by the user of the network connection 114b, such as a higher resolution or a lower value of the quantization parameter. The video sequence 208c may be streamed to network connection 114b, while the other video sequences 208a, 208b are still streamed to network connections 114c and 114a, respectively.

After a while, the desired video quality of network connection 114b may go back to normal again. If so, the encoded video sequence 208c becomes superfluous and may be removed. In that case, the controller 206 may instruct the encoder 202 to stop the encoding of the encoded video sequence 208c. Instead, the encoded video sequence 208a may again be streamed to both network connections 114b and 114c, while the encoded video sequence 208b is streamed to network connection 114a. Accordingly, the situation would go back to that shown in FIG. 3b again.

It may also happen that the bandwidth of network connection 114a returns to its initial value again. In that case, starting from the situation in FIG. 3b, the controller 206 would instruct the encoder 202 to stop the encoding of the encoded video sequence 208b and instead stream the encoded video sequence 208a to all network connections 114a, 114b, 114c as illustrated in FIG. 3a.

It will be appreciated that a person skilled in the art can modify the above-described embodiments in many ways and still use the advantages of the invention as shown in the embodiments above. For example, the described concept may be used to start up new video stream in a quick fashion. In more detail, referring to FIG. 3c, the further video sequence 208c may initially be encoded using the same parameters as the available stream 208a. The parameters of the further video sequence 208c may then be updated such that its video properties match those desired by the network connection 114b. As another example, the number of encoded sequences may be decreased if the available computational resources in the encoder 202 are not enough. Further, the video properties are not limited to those mentioned herein. Other video properties, such as whether an encoded video should be encrypted or not, may also be considered. Thus, the invention should not be limited to the shown embodiments but should only be defined by the appended claims. Additionally, as the skilled person understands, the shown embodiments may be combined.

The invention claimed is:

1. A method, performed in a camera, for capturing, encoding and streaming a video sequence over a plurality of network connections, comprising:
    capturing a video sequence using an image sensor of the camera,
    encoding, in parallel, the video sequence into a first number of encoded video sequences, each of the first number of encoded video sequence being encoded using different encoding parameters such that the encoded video sequences have different bitrates,
    streaming the encoded video sequences in parallel over the plurality of network connections, wherein each of the first number of encoded video sequences is streamed over at least one of the plurality of network connections, and, for each network connection, an encoded video sequence having a bitrate that matches a bitrate supported by a bandwidth of the ne work connection is streamed,
    detecting that the bandwidth of one of the network connections has changed, and
    in response to the detecting, increasing or decreasing how many video sequences are encoded in parallel from the first number to a second number, different from the first number, which are encoded in parallel and streamed over the plurality of network connections, wherein each of the second number of encoded video sequences is streamed over at least one of the plurality of network connections.

2. The method of claim 1, wherein the number of encoded video sequences is increased by encoding the video sequence into a further encoded video sequence in parallel with said number of encoded video sequences wherein the further encoded video sequence is streamed over said one of the network connections, while the remaining encoded video sequences are continued to be streamed over the other of the plurality of network connections.

3. The method of claim 2, wherein the further video sequence is encoded to have a bitrate corresponding to the bitrate supported by the bandwidth of said one of the network connections.

4. The method of claim 1, wherein the number of encoded video sequences is decreased by terminating the encoding and streaming of the encoded video sequence which is streamed to said one of the network connections, while maintaining the encoding and streaming of any remaining encoded video sequence.

5. The method of claim 4, wherein a remaining encoded video sequence is streamed to said one of the network connections, the remaining encoded video sequence having a bitrate matching the bitrate supported by the bandwidth, as changed, of said one of the network connections.

6. The method of claim 1, further comprising:
measuring or receiving feedback regarding bandwidths of the plurality of network connections,
identifying a number of distinct bitrates supported by the bandwidths of the plurality of network connections, and
setting the number of encoded video sequences to correspond to the number of distinct bitrates supported by the bandwidths of the plurality of network connections.

7. The method of claim 6, wherein the number of encoded video sequences is increased or decreased such that the number of encoded video sequences keeps corresponding to the number of distinct bitrates supported by the bandwidths of the network connections also after the bandwidth of said one of the network connections has changed.

8. The method of claim 1, further comprising:
setting encoding parameters used when producing the number of encoded video sequences such that the different bitrates of the number of encoded video sequences match the bitrates supported by the bandwidths of the plurality of network connections.

9. The method of claim 1, further comprising:
forwarding the captured video sequence to an image processing pipeline of the camera to perform image processing on the video sequence, and
forwarding the captured and image processed video sequence from the image processing pipeline to an encoder of the camera to perform said encoding of the video sequence.

10. A video camera for capturing, encoding and streaming a video sequence over a plurality of network connections, comprising:
an image sensor for capturing a video sequence,
an encoder configured to receive the video sequence captured by the image sensor and encode, in parallel, the video sequence into a first number of encoded video sequences, each of the first number of encoded video sequence being encoded using different encoding parameters such that the encoded video sequences have different bitrates,
a network interface configured to stream the encoded video sequences in parallel over the plurality of network connections, wherein each of the first number of encoded video sequences is streamed over at least one of the plurality of network connections, and, for each network connection, an encoded video sequence having a bitrate that matches a bitrate supported by a bandwidth of the network connection is streamed, and
a controller configured to detect that the bandwidth of one of the nets cork connections has changed, and in response to the detecting, instruct the encoder to increase or decrease how many video sequences are encoded in parallel from the first number to a second number, different from the first number, which are encoded in parallel and streamed over the plurality of network connections, wherein each of the second number of encoded video sequences is streamed over at least one of the plurality of network connections.

* * * * *